United States Patent
Gupta et al.

(10) Patent No.: US 9,294,714 B2
(45) Date of Patent: Mar. 22, 2016

(54) USER EQUIPMENT AND METHODS FOR ADAPTING SYSTEM PARAMETERS BASED ON EXTENDED PAGING CYCLES

(71) Applicant: Intel IP Corporation, Santa Clara, CA (US)

(72) Inventors: Maruti Gupta, Portland, OR (US); Ali Taha Koc, Portland, OR (US); Rath Vannithamby, Portland, OR (US); Satish Chandra Jha, Hillsboro, OR (US)

(73) Assignee: Intel IP Corporation, Santa Clara, CA (US)

( * ) Notice: Subject to any disclaimer, the term of this patent is extended or adjusted under 35 U.S.C. 154(b) by 142 days.

(21) Appl. No.: 14/132,974

(22) Filed: Dec. 18, 2013

(65) Prior Publication Data

US 2014/0321343 A1    Oct. 30, 2014

Related U.S. Application Data

(60) Provisional application No. 61/816,662, filed on Apr. 26, 2013.

(51) Int. Cl.
*H04W 52/02*    (2009.01)
*H04W 76/04*    (2009.01)
(Continued)

(52) U.S. Cl.
CPC ............ *H04N 7/141* (2013.01); *H04L 5/0032* (2013.01); *H04L 65/1006* (2013.01); *H04L 65/1016* (2013.01); *H04L 65/1069* (2013.01); *H04L 65/1073* (2013.01); *H04L 65/602* (2013.01);
(Continued)

(58) Field of Classification Search
None
See application file for complete search history.

(56) References Cited

U.S. PATENT DOCUMENTS

| 5,331,413 A | 7/1994 | Diner |
| 5,617,422 A | 4/1997 | Litzenberger et al. |

(Continued)

FOREIGN PATENT DOCUMENTS

| KR | 20080067273 A | 7/2008 |
| KR | 1020090006281 A | 1/2009 |

(Continued)

OTHER PUBLICATIONS

U.S. Appl. No. 14/107,400, Non Final Office Action mailed May 27, 2015, 21 pgs.

(Continued)

*Primary Examiner* — Chi H Pham
*Assistant Examiner* — Soon-Dong D Hyun
(74) *Attorney, Agent, or Firm* — Schwegman Lundberg & Woessner, P.A.

(57) ABSTRACT

Embodiments of wireless communication devices and method for discontinuous reception (DRX) mode in wireless communication are generally described herein. Some of these embodiments describe a wireless communication device having processing circuitry arranged to determine to use an extended paging discontinuous reception (DRX) value to increase a paging cycle length above a value and select a first periodicity, based on the extended paging DRX value, at which the UE is to perform evaluation of a parameter of a network in which the UE is opera. The wireless communication device may have physical layer circuitry arranged to transmit a message to the network, indicating that the UE desires to perform evaluation of the parameter at the first periodicity. Other methods and apparatuses are also described.

13 Claims, 3 Drawing Sheets

(51) Int. Cl.

| | | |
|---|---|---|
| *H04N 7/14* | (2006.01) | |
| *H04W 28/02* | (2009.01) | |
| *H04W 72/04* | (2009.01) | |
| *H04W 8/00* | (2009.01) | |
| *H04L 5/00* | (2006.01) | |
| *H04W 88/02* | (2009.01) | |
| *H04W 36/00* | (2009.01) | |
| *H04W 60/00* | (2009.01) | |
| *H04L 29/06* | (2006.01) | |
| *H04L 12/801* | (2013.01) | |
| *H04W 76/06* | (2009.01) | |
| *H04W 48/06* | (2009.01) | |
| *H04W 76/02* | (2009.01) | |

(52) U.S. Cl.
CPC .............. *H04L 65/608* (2013.01); *H04L 65/80* (2013.01); *H04W 8/005* (2013.01); *H04W 28/0289* (2013.01); *H04W 36/0066* (2013.01); *H04W 52/0212* (2013.01); *H04W 60/00* (2013.01); *H04W 72/0486* (2013.01); *H04W 76/048* (2013.01); *H04W 88/02* (2013.01); *H04L 47/10* (2013.01); *H04W 48/06* (2013.01); *H04W 76/027* (2013.01); *H04W 76/068* (2013.01)

(56) References Cited

U.S. PATENT DOCUMENTS

| | | |
|---|---|---|
| 5,686,957 A | 11/1997 | Baker |
| 6,104,721 A | 8/2000 | Hsu |
| 7,724,972 B2 | 5/2010 | Wang et al. |
| 8,019,175 B2 | 9/2011 | Lee et al. |
| 8,358,613 B1 | 1/2013 | Giallorenzi et al. |
| 8,570,359 B2 | 10/2013 | Ali et al. |
| 8,711,198 B2 | 4/2014 | Malzbender et al. |
| 8,830,892 B2 | 9/2014 | Chung et al. |
| 8,922,718 B2 | 12/2014 | House et al. |
| 8,970,653 B2 | 3/2015 | Bowen et al. |
| 8,977,063 B2 | 3/2015 | Lee et al. |
| 2004/0192211 A1 | 9/2004 | Gallagher et al. |
| 2005/0202823 A1 | 9/2005 | Shaheen et al. |
| 2008/0096566 A1 | 4/2008 | Brunner et al. |
| 2009/0040955 A1 | 2/2009 | Jung et al. |
| 2009/0147685 A1 | 6/2009 | Malhotra et al. |
| 2009/0210766 A1 | 8/2009 | Katayama et al. |
| 2009/0280802 A1 | 11/2009 | Chin et al. |
| 2010/0026781 A1 | 2/2010 | Ali et al. |
| 2010/0067433 A1 | 3/2010 | Cheng et al. |
| 2010/0074182 A1 | 3/2010 | Shao |
| 2010/0081391 A1 | 4/2010 | Suzuki et al. |
| 2010/0118111 A1 | 5/2010 | Bouazizi |
| 2010/0130237 A1 | 5/2010 | Kitazoe et al. |
| 2010/0202561 A1 | 8/2010 | Gorokhov et al. |
| 2010/0208607 A1 | 8/2010 | Chin et al. |
| 2010/0220652 A1 | 9/2010 | Ishii et al. |
| 2010/0238805 A1 | 9/2010 | Ludwig et al. |
| 2010/0317394 A1 | 12/2010 | Harris et al. |
| 2011/0019633 A1 | 1/2011 | Tajima et al. |
| 2011/0161441 A1 | 6/2011 | Haruna et al. |
| 2011/0195710 A1 | 8/2011 | Nas et al. |
| 2011/0217980 A1 | 9/2011 | Faurie et al. |
| 2011/0217985 A1 | 9/2011 | Gorokhov |
| 2011/0235706 A1 | 9/2011 | Demircin et al. |
| 2011/0242975 A1 | 10/2011 | Zhao et al. |
| 2011/0250888 A1 | 10/2011 | Ryu et al. |
| 2011/0258313 A1 | 10/2011 | Mallik et al. |
| 2011/0263255 A1 | 10/2011 | Alonso-rubio et al. |
| 2012/0008574 A1 | 1/2012 | Xiao et al. |
| 2012/0087396 A1 | 4/2012 | Nimbalker et al. |
| 2012/0176884 A1 | 7/2012 | Zhang et al. |
| 2012/0281621 A1 | 11/2012 | Lotfallah et al. |
| 2012/0287881 A1 | 11/2012 | Arnott et al. |
| 2012/0307794 A1 | 12/2012 | Shaheen et al. |
| 2012/0320141 A1 | 12/2012 | Bowen et al. |
| 2013/0039180 A1 | 2/2013 | Hong et al. |
| 2013/0039339 A1 | 2/2013 | Rayavarapu et al. |
| 2013/0040671 A1 | 2/2013 | Zawaideh et al. |
| 2013/0044697 A1 | 2/2013 | Yoo et al. |
| 2013/0045707 A1 | 2/2013 | Lee et al. |
| 2013/0051277 A1 | 2/2013 | Hakola et al. |
| 2013/0101036 A1 | 4/2013 | Zhou |
| 2013/0170415 A1* | 7/2013 | Fukuta et al. ................. 370/311 |
| 2013/0195074 A1 | 8/2013 | Keller et al. |
| 2013/0258919 A1* | 10/2013 | Damnjanovic ................ 370/311 |
| 2013/0301501 A1* | 11/2013 | Olvera-Hernandez et al. ............................ 370/311 |
| 2014/0176663 A1 | 6/2014 | Cutler et al. |
| 2014/0219088 A1 | 8/2014 | Oyman et al. |
| 2014/0225918 A1 | 8/2014 | Mittal et al. |
| 2014/0286215 A1* | 9/2014 | Koc et al. ...................... 370/311 |
| 2014/0295864 A1 | 10/2014 | Gunnarsson et al. |
| 2014/0320587 A1 | 10/2014 | Oyman |
| 2014/0321272 A1 | 10/2014 | Bangolae et al. |
| 2014/0321360 A1 | 10/2014 | Han et al. |
| 2014/0321369 A1 | 10/2014 | Davydov et al. |
| 2014/0323128 A1 | 10/2014 | Zaus et al. |
| 2014/0323133 A1 | 10/2014 | Yeh et al. |
| 2014/0325078 A1 | 10/2014 | Shan et al. |
| 2015/0195490 A1 | 7/2015 | Oyman et al. |

FOREIGN PATENT DOCUMENTS

| | | |
|---|---|---|
| KR | 20100054015 A | 5/2010 |
| KR | 1020110051787 A | 5/2011 |
| KR | 1020110102935 A | 9/2011 |
| KR | 1020120099805 A | 9/2012 |
| TW | 201446026 A | 12/2014 |
| TW | 201501498 A | 1/2015 |
| TW | 201507374 A | 2/2015 |
| WO | WO-2007053851 A2 | 5/2007 |
| WO | WO-2012065658 A1 | 5/2012 |
| WO | WO-2013025040 A2 | 2/2013 |
| WO | WO-2014160765 A1 | 10/2014 |
| WO | WO-2014176058 A1 | 10/2014 |
| WO | WO-2014176087 A1 | 10/2014 |
| WO | WO-2014176089 A1 | 10/2014 |
| WO | WO-2014176106 A1 | 10/2014 |
| WO | WO-2014176200 A1 | 10/2014 |
| WO | WO-2014176245 A1 | 10/2014 |
| WO | WO-2014176480 A1 | 10/2014 |

OTHER PUBLICATIONS

U.S. Appl. No. 14/109,121, Non Final Office Action mailed Apr. 29, 2015, 6 pgs.
U.S. Appl. No. 14/132,525, Non Final Office Action mailed May 7, 2015, 15 pgs.
"Control Signaling to Support for Enhanced DL MIMO", R1-104021, 3GPP TSG RAN WG1 Meeting #61bis, (2010), 6 pgs.
"Discussion on scenarios for evaluation of interference cancellation and suppression schemes", R1-130927, 3GPP TSG-RAN WG1 #72bis, (2013), 3 pgs.
"International Application No. PCT/US2014/031845, International Search Report mailed Aug. 26, 2014", 3 pgs.
"International Application No. PCT/US2014/031845, Written Opinion mailed Aug. 26, 2014", 4 pgs.
"International Application No. PCT/US2014/033965, International Search Report mailed Aug. 7, 2014", 3 pgs.
"International Application No. PCT/US2014/033965, Written Opinion mailed Aug. 7, 2014", 5 pgs.
"International Application No. PCT/US2014/034307, International Search Report mailed Aug. 11, 2014", 3 pgs.
"International Application No. PCT/US2014/034307, Written Opinion mailed Aug. 11, 2014", 5 pgs.
"International Application No. PCT/US2014/034337, International Search Report mailed Aug. 8, 2014", 3 pgs.
"International Application No. PCT/US2014/034337, Written Opinion mailed Aug. 8, 2014", 6 pgs.
"International Application No. PCT/US2014/034480, International Search Report mailed Aug. 26, 2014", 3 pgs.

(56) References Cited

OTHER PUBLICATIONS

"International Application No. PCT/US2014/034480, Written Opinion mailed Aug. 26, 2014", 4 pgs.
"International Application No. PCT/US2014/034879, International Search Report mailed Aug. 28, 2014", 3 pgs.
"International Application No. PCT/US2014/034879, Written Opinion mailed Aug. 28, 2014", 8 pgs.
"International Application No. PCT/US2014/034966, International Search Report mailed Aug. 22, 2014", 3 pgs.
"International Application No. PCT/US2014/034966, Written Opinion mailed Aug. 22, 2014", 5 pgs.
"International Application No. PCT/US2014/035409, International Search Report mailed Aug. 26, 2014", 4 pgs.
"International Application No. PCT/US2014/035409, Written Opinion mailed Aug. 26, 2014", 6 pgs.
"Taiwanese Application No. 103113875, Amendment filed Oct. 16, 2014", English Translation, 2 pgs.
"Views on the use of DM RS ports / scrambling sequences for MU-MIMO", R1-103830, 3GPP TSG-RAN WG1 Meeting #61bis, (2010), 6 pgs.
Suckchel, Yang, "An Adaptive Discontinuous Reception Mechanism Based on Extended Paging Indicator for Power Saving in UMTS", In: Vehicular Technology Conference, VTC-2006 Fall. IEEE 64th, [Online]. Retrieved from the Internet: <http://i.eexplore.ieee.org/stamp/stamp.jsparnumber=4109444>, (2006), 5 pgs.
U.S. Appl. No. 14/107,400, Response filed Aug. 26, 2015 to Non Final Office Action mailed May 27, 2015, 10 pgs.
"3rd Generation Partnership Project; Technical Specification Group Radio Access Network; Evolved Universal Terrestrial Radio Access (E-UTRA); Physical layer procedures (Release 11)", 3GPP TS 36.213 V11.4.0, (Sep. 2013), 182.
U.S. Appl. No. 14/109,121, Non Final Office Action mailed Aug. 14, 2015, 8 pgs.
U.S. Appl. No. 14/109,121, Response filed Jul. 28, 2015 to Non Final Office Action mailed Apr. 29, 2015, 10 pgs.
U.S. Appl. No. 14/132,525, Examiner Interview Summary mailed May 28, 2015, 3 pgs.
U.S. Appl. No. 14/132,525, Response filed Aug. 7, 2015 to Non Final Office Action mailed May 7, 2015, 14 pgs.
U.S. Appl. No. 14/135,265, Non Final Office Action mailed Jul. 29, 2015, 11 pgs.
U.S. Appl. No. 14/140,823, Non Final Office Action mailed Aug. 5, 2015, 6 pgs.
U.S. Appl. No. 14/140,823, Preliminary Amendment filed Mar. 26, 2014, 3 pgs.
U.S. Appl. No. 14/141,034, Preliminary Amendment filed Dec. 26, 2014, 7 pgs.
U.S. Appl. No. 14/141,985, Non Final Office Action mailed Jul. 8, 2015, 20 pgs.

\* cited by examiner

USER EQUIPMENT AND METHODS FOR ADAPTING SYSTEM PARAMETERS BASED ON EXTENDED PAGING CYCLES

PRIORITY APPLICATION

This application claims priority to U.S. Provisional Application Ser. No. 61/816,662, filed Apr. 26, 2013, which is incorporated herein by reference in its entirety.

TECHNICAL FIELD

Embodiments pertain to wireless communications. Some embodiments relate to extending paging cycles in wireless networks including those networks that operate in accordance with a 3GPP Evolved Universal Terrestrial Radio Access Network (E-UTRAN) Long-Term-Evolution advanced (LTE-A) network standard.

BACKGROUND

Power savings is important for wireless communication devices. In some conventional wireless communication networks, devices may enter a discontinuous reception (DRX) mode to save power when not communicating with other devices or with other entities in the network. Some current methods for power saving in DRX mode may be inefficient, particularly in the case of devices that perform machine-type communication (MTC) or that include applications that transmit in an automated fashion.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
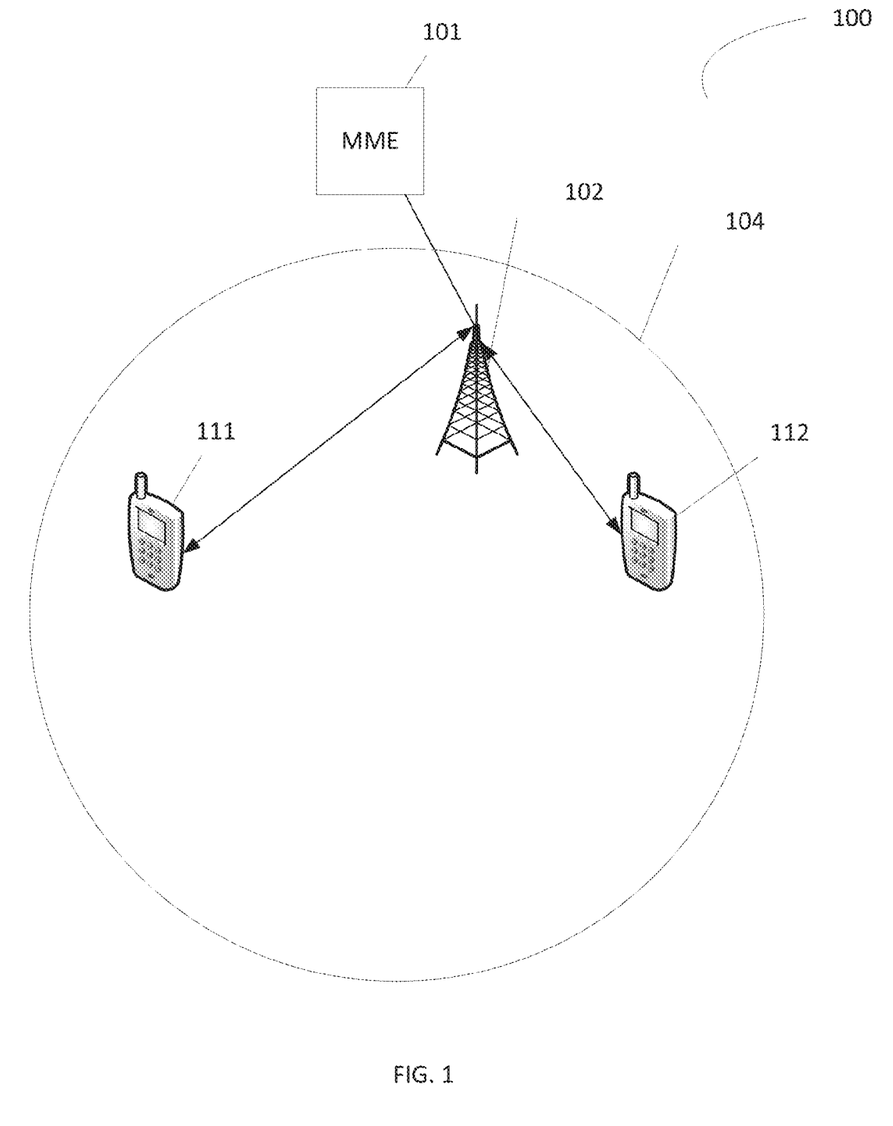
FIG. 1 shows a wireless communication network according to some embodiments described herein.

FIG. 1 shows a wireless communication network 100, according to some embodiments described herein. Wireless communication network 100 may include a mobile management entity (MME) 101, a base station, such as an evolved Node-B (eNodeB) 102, and user equipment (UEs) 111 and 112. ENodeB 102 and UE 111 and 112 may operate to wirelessly communicate with each other in wireless communication network 100. While some embodiments herein are described regarding an eNodeB 102 and MME 101 operating in accordance with 3rd Generation Partnership Project (3GPP) standards for Long Term Evolution advanced (LTE-A), other embodiments can be applicable to 3GPP Universal Mobile Telecommunications System (UMTS) systems such as a NodeB or serving general packet radio service (GPRS) support node (SGSN).

An example of wireless communication network 100 includes an evolved universal terrestrial radio access network (EUTRAN) using 3GPP LTE-A standards operating in time division duplex (TDD) mode. Another example of wireless communication network 100 includes a EUTRAN using 3GPP-LTE-A standard operating in frequency division duplex (FDD) mode. Further examples of wireless communication network 100 include a UTRAN using 3GPP-UMTS standard operating in TDD, FDD, or dual-mode operation. Additional examples of wireless communication network 100 include Worldwide Interoperability for Microwave Access (WiMax) networks, 3rd generation (3G) networks, Wi-Fi networks, networks, and other wireless data communication networks.

Examples of UEs 111 and 112 include cellular telephones (e.g., smartphones), tablets, e-readers (e.g., e-book readers), laptops, desktops, personal computers, servers, personal digital assistants (PDAs), web appliances, set-top boxes (STBs), network routers, network switches, network bridges, parking meters, sensors, and other devices. Some devices (e.g., parking meters) among these example devices may be considered as delay tolerant devices, which may include machine-type communication (MTC) devices. An MTC device may not need user interaction to initiate communication with the network (e.g., wireless communication network 100). Some other devices (e.g., smartphones) among these example devices may be not be considered as delay tolerant devices (e.g., non-MTC devices). A non-MTC device (e.g., user equipment (UE) such as a smartphone) may need user interaction to initiate communication with the network (e.g., wireless communication network 100).

MME 101 may be a main control node for wireless communication network 100. MME 101 may communicate with eNodeB 102 to track and send messages to UEs 111 and 112. MME 101 may communicate with other UEs besides UE 111 and 112 through one or more other eNodeBs similar to, or identical to, eNodeB 102.

ENodeB 102 may operate as a serving eNodeB in a geographic area, such as cell 104 in wireless communication network 100. FIG. 1 shows wireless communication network 100 including only one eNodeB (e.g., eNodeB 102) as an example. Wireless communication network 100, however, may include multiple eNodeBs (e.g., multiple eNodeBs similar to, or identical to, eNodeB 102). Each of the multiple eNodeBs may serve a particular cell in wireless communication network 100 and may or may not neighbor eNodeB 102.

UEs 111 and 112 may be served by eNodeB 102 in cell 104 (e.g., serving cell 104). UEs 111 and 112 can select cell 104 on which to "camp" to obtain services through eNodeB 102. FIG. 1 shows wireless communication network 100 including only two UEs (e.g., UEs 111 and 112) served by eNodeB 102 in cell 104 as an example. Wireless communication network 100, however, may include more than two UEs served by eNodeB 102. ENodeB 102 and each of UEs 111 and 112 may operate to communicate with each other using an orthogonal frequency division multiple access (OFDMA) technique.

Each of UEs 111 and 112 may operate to receive OFDMA communication signals over a multicarrier communication channel in accordance with an OFDMA technique. The OFDMA technique may be either a frequency domain duplexing (FDD) technique that uses different uplink and downlink spectrum or a time domain duplexing (TDD) technique that uses the same spectrum for uplink and downlink. The OFDMA communication signals may comprise orthogonal subcarriers.

Each of UEs 111 and 112 may operate in different operational states. In one or more of these operational states, UE 111 may enter a power saving mode to save power. For example, UE 111 may enter a power saving mode after a specific amount of time of no active communication (e.g., no exchanging of data) between UE 111 and eNodeB 102. Similarly, UE 112 may enter a power saving mode after a specific amount of time of no active communication (e.g., no exchanging of data) between UE 112 and eNodeB 102. An example of a power saving mode in UEs 111 and 112 includes an Idle mode in accordance with 3GPP-LTE-A.

UE 111 power consumption can be reduced by extending the paging cycle used by the UE 111 while the UE 111 is in Idle mode so that the UE 111 wakes up less frequently and thus consumes less power. In some current systems, the paging cycle is limited to 2.56 seconds. However, this amount of time may be inadequate for MTC devices, or for other devices that wake from Idle mode only occasionally. Accordingly, some proposed solutions extend the paging cycle.

While extended paging cycles may permit the UE 111 to wake from Idle mode less often, thereby achieving some level of power savings, the UE 111 may still wake up periodically to perform functions such as a tracking area update (TAU), neighbor cell measurements and evaluation, serving cell evaluation, system information (SI) updates, etc. Accordingly, some goals of extended paging cycles may not be achieved.

Some embodiments modify parameters for TAU, neighbor cell measurements and evaluation, serving cell evaluation, SI updates, and other functionalities for delay tolerant MTC and non-MTC devices when these devices are using extended paging cycles to allow these devices to remain in an Idle mode for a time commensurate with the extended paging cycle in use by that device. For example, in current systems SI can remain valid for up to three hours, after which a device must wake to receive or update SI. However, because an extended paging cycle can be longer than three hours, some embodiments can provide parameters such that SI remains valid for longer than three hours so that the device can also remain in Idle mode for longer than three hours.

Similarly, current systems provide TAU timers that extend up to six minutes, after which a device must awaken to provide TAU. However, extended paging cycles can be longer than six minutes. Accordingly, in current systems, a UE 111 may awaken from sleep to provide TAU even though the UE 111 could have remained in a sleep mode longer based on the extended paging cycle specified for the UE 111. Accordingly, some embodiments provide parameters to extend TAU timers greater than, for example, six minutes.

Similarly, a UE 111 performs periodic detection, measurement and evaluation of cells for possible cell reselection. If the UE 111 wakes up for these functions more frequently than specified by the extended paging cycle, power savings benefits of extended paging cycles may be degraded. Accordingly, some embodiments provide parameters to increase the period of these or other periodic detections, measurements, and evaluation.

Idle Mode Measurement and Cell Reselection

A UE 111 can perform cell reselection procedures to determine if the UE 111 should camp on another cell in the network 100. The UE 111 performs various measurements as part of a cell reselection process, based on various criteria. For example, if a serving cell (e.g., cell 104 served by eNodeB 102) fulfills a cell selection RX level (Srxlev) criteria or cell selection quality (Squal) criteria the UE 111 may not perform measurements on other intra-frequency cells or inter-frequency cells (not shown in FIG. 1) indicated by the serving cell 104. On the other hand, if the serving cell 104 does not meet these or other criteria, the UE 111 may perform such measurements. Furthermore, depending on the measurement results obtained by the UE 111, the UE 111 may perform evaluations and measurements of the serving cell 104 or neighboring cells more frequently.

These measurements and evaluations of serving and neighboring cells may cause the UE 111 to wake up frequently, based on parameters defined in, for example, 3GPP TS 36.304 and 3GPP TS 36.133. Some embodiments provide for modification of these parameters to allow the UE 111 to avoid waking between extended paging cycles by providing extended cell detection, measurement and evaluation periods for UE 111 as described herein.

For example, the following change may be made to provide the following example extended values for $T_{higher\_priority\_search}$ provided in 3GPP TS 36.133:

TABLE 1

Extended Values for $T_{higher\_priority\_search}$:

| Paging Cycle (in seconds) | $T_{higher\_priority\_search}$ (in seconds) |
|---|---|
| 5.12 | $60*N_{layers}$ |
| 10.24 | $60*N_{layers}$ |
| >10.24 and <60 | $60*N_{layers}$ |
| >60 | Paging Cycle * $N_{layers}$ |
| >$60*N_{layers}$ | Paging Cycle |

When the UE 111 is in either a Camped Normally state or a Camped on Any Cell state on a serving cell 104, the UE 111 will attempt to detect, synchronize, and monitor intra-frequency, inter-frequency and inter-RAT cells indicated by the serving cell 104. The UE will search every layer of higher priority at least every Thigher_priority_search=(60*Nlayers) seconds, where Nlayers is the total number of configured higher priority E-UTRA, UTRA FDD, UTRA TDD, CDMA2000 1x and HRPD carrier frequencies and is additionally increased by one if one or more groups of Global System for Mobile Communications (GSM) frequencies is configured as a higher priority. Higher Priority Cells can be Intra—frequency, Inter-frequency or Inter-radio access technology (RAT).

The following change may be made to provide the following example extended values for Nserv provided in 3GPP TS 36.133:

TABLE 2

Extended values for $N_{serv}$:

| Paging Cycle (in seconds) | $N_{serv}$ (number of paging cycles) |
|---|---|
| 5.12 | 2 |
| 10.24 | 2 |
| >10.24 | 2 |

The UE 111 will measure the reference signal received power (RSRP) and reference signal received quality (RSRQ) level of the serving cell 104 as well as cell selection criteria S defined in 3GPP TS 36.304 for the serving cell 104 at least every Paging cycle as given by the value for Nserv. The UE 111 will filter the RSRP and RSRQ measurements of the serving cell 104 using at least two measurements. Within the set of measurements used for the filtering, at least two measurements shall be spaced by, at least Paging cycle/2.

If the UE 111 has evaluated in Nserv consecutive Paging cycles that the serving cell 104 does not fulfil cell selection criteria S, the UE 111 will initiate the measurements of all neighbor cells indicated by the serving cell 104, regardless of the measurement rules currently limiting UE 111 measurement activities.

The following changes may be made in detection, measurement and cell evaluation for intra-frequency cell reselection by providing the following example extended values of Tdetect,EUTRAN_Intra, Tmeasure,EUTRAN_Intra, or Tevaluate,E-UTRAN_intra provided in 3GPP TS 36.133:

TABLE 3

Extended Values for $T_{detect, EUTRAN\_Intra}$, $T_{measure, EUTRAN\_Intra}$, and $T_{evaluate, E-UTRAN\_intra}$.

| Paging Cycle (seconds) | $T_{detect, EUTRAN\_Intra}$ (number of paging cycles) | $T_{measure, EUTRAN\_Intra}$ (number of paging cycles) | $T_{evaluate, E-UTRAN\_intra}$ (number of paging cycles) |
| --- | --- | --- | --- |
| 5.12 | 23 | 1 | 3 |
| 10.24 | 23 | 1 | 3 |
| >10.24 and <60 | 23 | 1 | 3 |
| >60 | 10 | 1 | 3 |

The UE 111 will evaluate whether a newly detectable intra-frequency cell meets the reselection criteria defined in 3GPP TS 36.304 within Tdetect,EUTRAN_Intra when the corresponding Treselection=0. The UE 11 will measure RSRP and RSRQ at least every Tmeasure,EUTRAN_Intra for intra-frequency cells that are identified and measured according to measurement rules specified in 3GPP TS 36.304. The UE 111 will filter RSRP and RSRQ measurements of each measured intra-frequency cell using at least two measurements. Within the set of measurements used for the filtering, at least two measurements will be spaced by at least Tmeasure,EUTRAN_Intra/2.

For an intra-frequency cell that has been already detected, but that has not been reselected to, the filtering will be such that the UE 111 will evaluate that the intra-frequency cell has met reselection criterion defined in TS 36.304 within Tevaluate,E-UTRAN_intra when Treselection=0 provided that the cell is at least 3 dB better ranked. When evaluating cells for reselection, the side conditions for RSRP and SCH apply to both serving and non-serving intra-frequency cells. If Treselection is non-zero and the intra-frequency cell is better ranked than the serving cell (e.g. cell 104), the UE 111 shall evaluate this intra-frequency cell for the Treselection time. If this cell remains better ranked within this duration, then the UE 111 shall reselect that cell.

The following changes may be made in detection, measurement and cell evaluation for equal or lower priority inter-frequencies for inter-frequency cell reselection by providing the following example extended values of $T_{detect,EUTRAN\_Inter}$, $T_{measure,EUTRAN\_Inter}$, or $T_{evaluate,EUTRAN\_Inter}$ provided in 3GPP TS 36.133:

If Srxlev>SnonIntraSearchP and Squal>SnonIntraSearchQ then the UE 111 will search for inter-frequency layers of higher priority at least every Thigher_priority_search as described in Table 1 herein.

If Srxlev≤SnonIntraSearchP or Squal≤SnonIntraSearchQ then the UE 111 shall search for and measure inter-frequency layers of higher, equal or lower priority in preparation for possible reselection. In this scenario, the minimum rate at which the UE 111 will search for and measure higher priority layers shall be the same as that defined below.

The UE 111 will evaluate whether a newly detectable inter-frequency cell meets the reselection criteria defined in 3GPP TS 36.304 within $K_{carrier}*T_{detect,EUTRAN\_Inter}$ if at least carrier frequency information is provided for inter-frequency neighbor cells by the serving cells when $T_{reselection}=0$ provided that the reselection criteria is met by a margin of at least 5 dB for reselections based on ranking or 6 dB for RSRP reselections based on absolute priorities or 4 dB for RSRQ reselections based on absolute priorities.

The parameter $K_{carrier}$ is the number of E-UTRA inter-frequency carriers indicated by the serving cell (e.g., cell 104). When higher priority cells are found by the higher priority search, the UE 111 will measure these higher priority cells at least every $T_{measure,E\text{-}UTRAN\_Inter}$. The UE 111 will measure RSRP or RSRQ at least every $K_{carrier}*T_{measure,EUTRAN\_Inter}$ for identified lower or equal priority inter-frequency cells. The UE will filter RSRP or RSRQ measurements of each measured higher, lower and equal priority inter-frequency cell using at least 2 measurements. Within the set of measurements used for the filtering, at least two measurements shall be spaced by at least $T_{measure,EUTRAN\_Inter}/2$.

For an inter-frequency cell that has been already detected, but that has not been reselected to, the filtering will be such that the UE 111 will evaluate whether the inter-frequency cell has met reselection criterion defined 3GPP TS 36.304 within $K_{carrier}*T_{evaluate,EUTRAN\_Inter}$ when $T_{reselection}=0$. If $T_{reselection}$ has a non-zero value and the inter-frequency cell is better ranked than the serving cell (e.g., cell 104), then the UE 111 will evaluate this inter-frequency cell for the $T_{reselection}$ time.

TABLE 4

Extended Values for $T_{detect, EUTRAN\_Inter}$, $T_{measure, EUTRAN\_Inter}$, and $T_{evaluate, E-UTRAN\_inter}$.

| Paging Cycle (seconds) | $T_{detect, EUTRAN\_Inter}$ (number of paging cycles) | $T_{measure, EUTRAN\_Inter}$ (number of paging cycles) | $T_{measure, EUTRAN\_Inter}$ (number of paging cycles) |
| --- | --- | --- | --- |
| 5.12 | 23 | 1 | 3 |
| 10.24 | 23 | 1 | 3 |
| >10.24 and <60 | 23 | 1 | 3 |
| >60 | 10 | 1 | 3 |

If this inter-frequency cell remained better ranked within that duration, then the UE 111 will reselect this inter-frequency cell.

If $S_{rxlev} > S_{nonIntraSearchP}$ and $S_{qual} > S_{nonIntraSearchQ}$, then the UE 111 will search for inter-RAT layers of higher priority at least every $T_{higher\_priority\_search}$ where $T_{higher\_priority\_search}$ is described in Table 1 herein.

If $S_{rxlev} \leq S_{nonIntraSearchP}$ or $S_{qual} \leq S_{nonIntraSearchQ}$ then the UE 111 will search for and measure inter-RAT layers of higher, lower priority in preparation for possible reselection. In this scenario, the minimum rate at which the UE 111 will search for and measure higher priority inter-RAT layers will be the same as that defined in Table 5 herein for lower priority RATs.

The following changes may be made in inter-RAT cell selection parameters by providing the following example extended values for $T_{detectUTRA\_FDD}$, $T_{measureUTRA\_FDD}$, and $T_{evaluateUTRA\_FDD}$ provided in 3GPP TS 36.133:

TABLE 5

Extended Values for $T_{detectUTRA\_FDD}$, $T_{measureUTRA\_FDD}$, and $T_{evaluateUTRA\_FDD}$.

| Paging cycle length (seconds) | $T_{detectUTRA\_FDD}$ (seconds) | $T_{measureUTRA\_FDD}$ (number of paging cycles) | $T_{evaluateUTRA\_FDD}$ (number of paging cycles) |
| --- | --- | --- | --- |
| 5.12 | 120 | 2 | 6 |
| 10.24 | 120 | 2 | 6 |
| >10.24 | 12*Paging Cycle | 1 | 3 |

$N_{UTRA\_carrier}$ is the number of carriers in the neighbor frequency list. The UE 111 will evaluate whether newly detectable UTRA FDD cells have met the reselection criteria defined in 3GPP TS 36.304 within time $(N_{UTRA\_carrier})*T_{detectUTRA\_FDD}$ when $S_{rxlev} \leq S_{nonIntraSearchP}$ or $S_{qual} \leq S_{nonIntraSearchQ}$ when $T_{reselectionRAT}=0$ provided that the reselection criteria is met by a margin of at least 6 dB for reselections based on Received Signal Code Power (RSCP), or a margin of at least 3 dB for reselections based on Ec/Io. UE 111 will measure cells which have been detected at least every $(N_{UTRA\_carrier})*T_{measureUTRA\_FDD}$ when $S_{rxlev} \leq S_{nonIntraSearchP}$ or $S_{qual} \leq S_{nonIntraSearchQ}$.

For a cell that has been already detected, but that has not been reselected to, the filtering shall be such that the UE 111 will evaluate that an already identified UTRA FDD cell has met reselection criterion defined in 3GPP TS 3 6.304 within $(N_{UTRA\_carrier})*T_{evaluateUTRA\_FDD}$ when $T_{reselection}=0$ provided that the reselection criteria is met by a margin of at least 6 dB for reselections based on RSCP, or a margin of at least 3 dB for reselections based on Ec/Io. If the $T_{reselection}$ timer is non-zero and the UTRA TDD cell is satisfied with the reselection criteria which are defined in 3GPP TS 36.304, the UE 111 will evaluate this UTRA TDD cell for the $T_{reselection}$ time. If this cell remains satisfied with the reselection criteria within this duration, then the UE 111 will reselect that cell.

The following changes are provided for cell selection for lower-priority RATs in the case of inter-RAT cell reselection by providing the following example extended values for $T_{detectUTRA\_TDD}$, $T_{measureUTRA\_TDD}$, and $T_{evaluateUTRA\_TDD}$ provided in 3GPP TS 36.133:

TABLE 6

Extended Values for $T_{detectUTRA\_FDD}$, $T_{measureUTRA\_FDD}$, and $T_{evaluateUTRA\_FDD}$.

| Paging cycle length (seconds) | $T_{detectUTRA\_TDD}$ (seconds) | $T_{measureUTRA\_TDD}$ (number of paging cycles) | $T_{evaluateUTRA\_TDD}$ (number of paging cycles) |
| --- | --- | --- | --- |
| 5.12 | 120 | 2 | 6 |
| 10.24 | 120 | 2 | 6 |
| >10.24 | 12*Paging Cycle | 1 | 3 |

The UE 111 will evaluate whether newly detectable UTRA TDD cells have met the reselection criteria in 3GPP TS 36.304 within time $(N_{UTRA\_carrier\_TDD})*T_{detectUTRA\_TDD}$ when $S_{rxlev} \leq S_{nonIntraSearchP}$ or $S_{qual} \leq S_{nonIntraSearchQ}$ when $T_{reselection}=0$ provided that the reselection criteria is met by a margin of at least 6 dB. Cells which have been detected shall be measured at least every $(N_{UTRA\_carrier\_TDD})*T_{measureUTRA\_TDD}$ if $S_{rxlev} \leq S_{nonIntraSearchP}$ or $S_{qual} \leq S_{nonIntraSearchQ}$.

For a cell that has been already detected, but that has not been reselected to, the filtering shall be such that the UE 111 will evaluate that an already identified UTRA TDD cell has met reselection criterion defined in 3GPP TS 36.304 within $N_{UTRA\_carrier\_TDD}*T_{evaluateUTRA\_TDD}$ when $T_{reselection}=0$ provided that the reselection criteria is met by a margin of at least 6 dB. If $T_{reselection}$ timer has a non-zero value and the UTRA TDD cell is satisfied with the reselection criteria which are defined in 3GPP TS 36.304, the UE 111 will evaluate this UTRA TDD cell for the $T_{reselection}$ time. If this cell remains satisfied with the reselection criteria within this duration, then the UE 111 will reselect that cell.

Periodic TAU Timer (T3412) Extension

A UE 111 initiates a TAU procedure in certain situations such as upon expiration of the periodic TAU T3412, upon detecting that the UE 111 has entered into a tracking area that is not in the list of tracking areas registered in the MME 101, upon receiving an indication from the lower layers that the radio resource control (RRC) connection was released with the cause "load balancing TAU required" or based on other reasons, for example reasons defined in 3GPP TS 24.301. Some embodiments provide extended values for TAU timer T3412 based on extended paging cycle length.

Current specifications define a default value for T3412 of 54 min. The value of T3412 can vary from 6 minutes to 186 minutes as specified in 3GPP TS 24.301. Because the extended paging cycle can be longer than three hours, extended timer T3412 values are provided.

The following example extended values can be provided for T3412 in 3GPP TS 36.133:

TABLE 7

Extended values for T3412.

| Paging Cycle | Maximum value of T3412 |
| --- | --- |
| 5.12 seconds and 10.24 seconds | 186 minutes |
| >10.24 seconds and less than or equal to one hour | 186 minutes |
| Greater than one hour | N*Paging Cycle, where N = integer between 3 and 100, inclusive |

Extended Values for Validity Duration of System Information Stored in the UE A UE 111 acquires system information (SI), for example master information blocks (MIB), SIB1, and portions of SIB2 through SIB 13, while the UE 111 is in Idle mode. For example, the UE 111 may acquire SI to get the cell reselection priorities (absolute priorities of different E-UTRAN frequencies or inter-RAT frequencies), and RSRP/RSRQ threshold values and frequency/cell/RAT dependent measurement offsets when the UE 111 is in Idle mode. Current 3GPP specifications specify that SI, acquired and stored at the UE 111, is valid for a maximum of three hours. Because the extended paging cycle can be longer than three hours, extended SI validity duration values are provided.

The following example extended values can be provided for SI validity duration in 3GPP TS 36.133:

TABLE 8

Extended values for SI Validity duration.

| Paging Cycle | SI validity duration |
| --- | --- |
| 5.12 seconds and 10.24 seconds | 3 hours |
| >10.24 seconds and less than or equal to one hour | 3 hours |
| Greater than one hour | 3*Extended paging cycle |

Example Device for Implementing Embodiments

Figure 2:
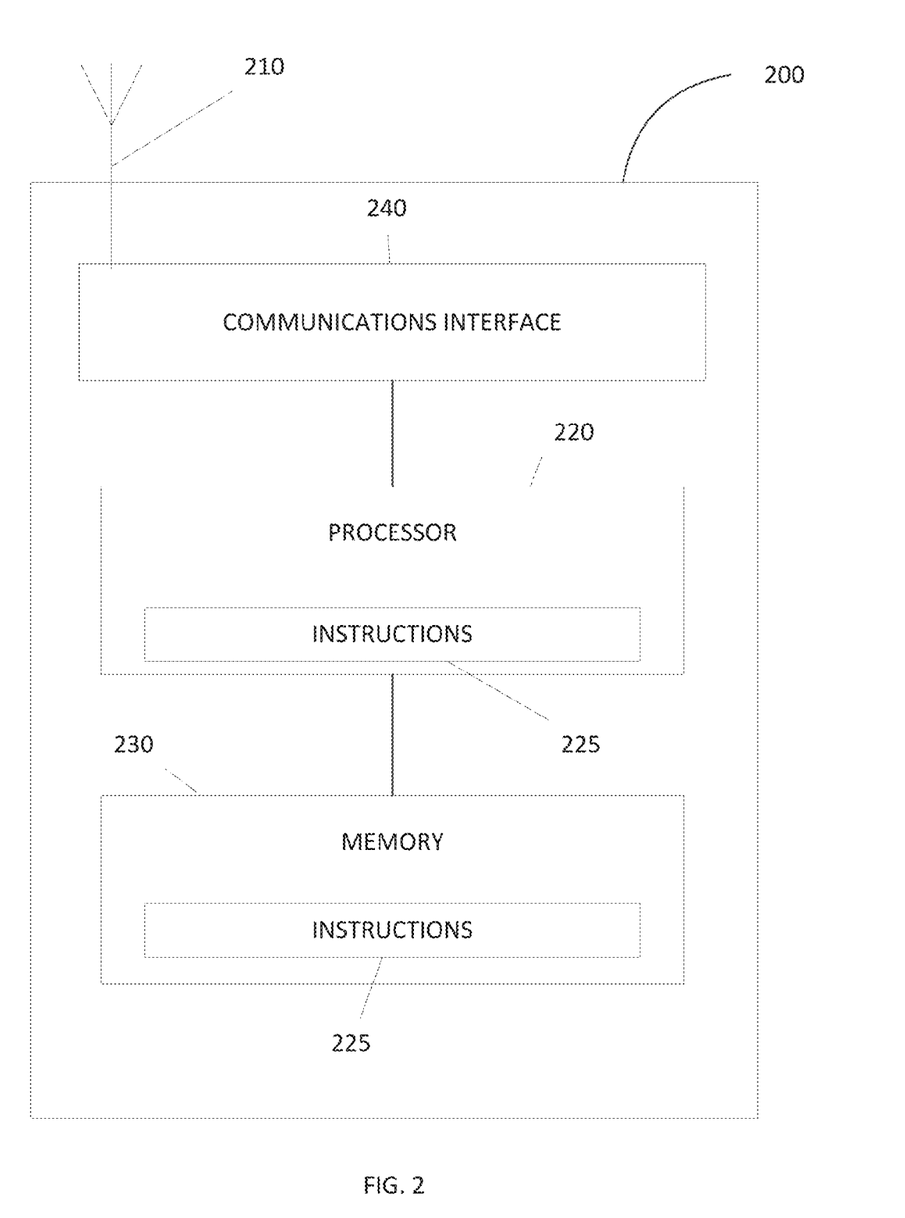
FIG. 2 is a block diagram of the basic components of a user equipment in accordance with some embodiments.

FIG. 2 is a block diagram of the basic components of a UE 200 in accordance with some embodiments. The UE 200 may be suitable as a UE 111 (FIG. 1). The UE 200 may support methods for power saving in accordance with embodiments described above with respect to FIG. 1 and Tables 1-8.

The UE 200 includes one or more antennas 210 arranged to communicate with an eNodeB 102 (FIG. 1), or other types of wireless local area network (WLAN) access points. The UE 200 further includes a processor 220, instructions 225, and a memory 230. The UE 200 may further include a communications interface 240. In one embodiment, the memory 230 includes, but is not limited to, random access memory (RAM), dynamic RAM (DRAM), static RAM (SRAM), synchronous DRAM (SDRAM), double data rate (DDR) SDRAM (DDR-SDRAM), or any device capable of supporting high-speed buffering of data.

Processor 220 may include circuitry to allow the UE 200 to determine to use an extended paging discontinuous reception (DRX) value to increase a paging cycle length above a value, and to select a periodicity, based on the extended paging DRX value, at which the UE 200 is to perform evaluation of a parameter of a network in which the UE 111 is operating. The periodicity can correspond to a periodicity with which the UE 111 is to perform measurements of cells in the network, either the serving cell 104 (FIG. 1) or another cell, with various priority levels relative the serving cell 104. The processor 220 can further allow the UE 200 to increase a timer expiration value for performing network operations, for example TAU procedures, based on the extended paging DRX value. The processor 220 can further allow the UE 200 to increase a validity period of system information received from the network based on the extended paging DRX value.

Example embodiments allow a UE 200 to transmit, using the communications interface 240, a message to the network, indicating that the UE desires to perform evaluation of the parameter at the first periodicity.

The processor 220 may include logic or code to enable the UE 200 to process signals received from the network through the antenna 210. The processor 220 may include code or other instructions 225 to allow the UE 200 to determine to use an extended paging discontinuous reception (DRX) value to increase a paging cycle length above a value. The instructions 225 may further allow the UE 200 to select a first periodicity, based on the extended paging DRX value, at which the UE 200 is to perform evaluation of a parameter of a network in which the UE 200 is operating. The instructions 225 may further allow the UE 200 to transmitting a message to the network, indicating that the UE desires to perform evaluation of the parameter at the first periodicity.

Example eNodeB for Implementing Embodiments

Figure 3:
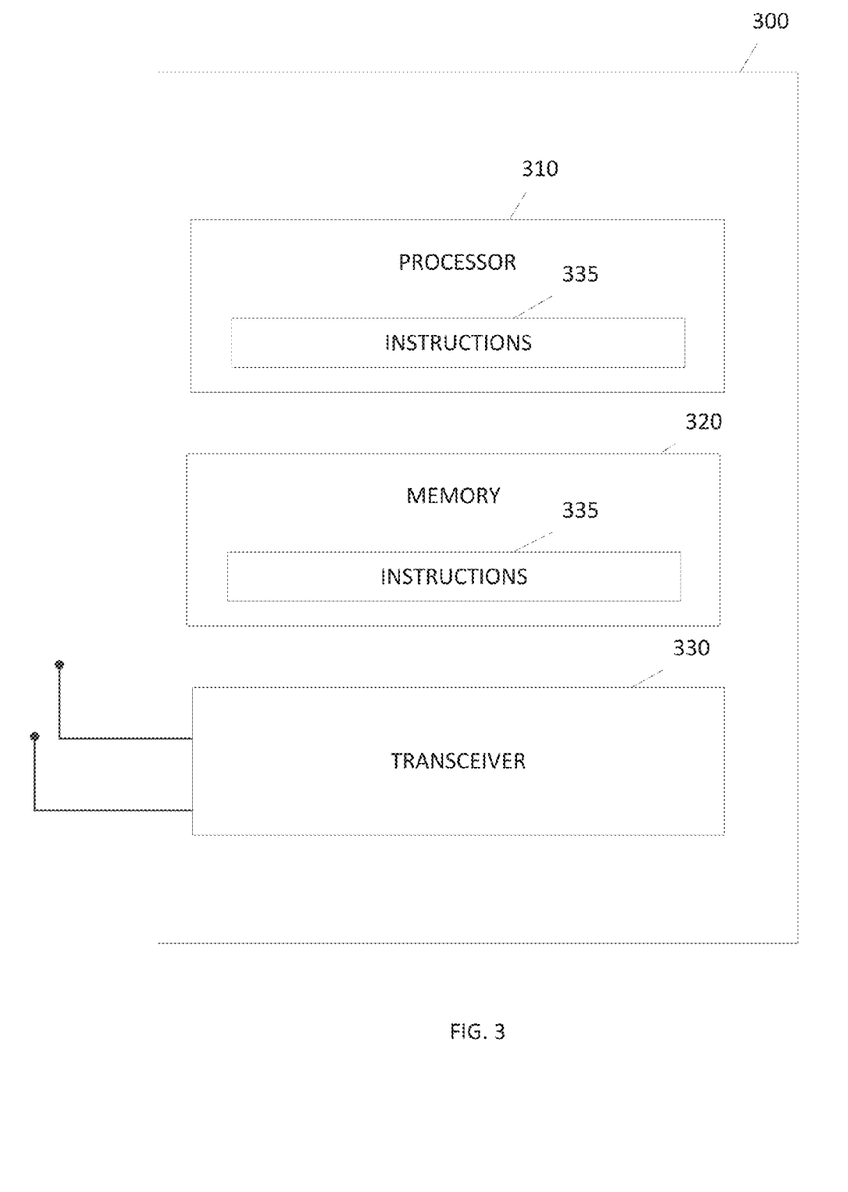
FIG. 3 is a block diagram showing details of an eNodeB according to some embodiments described herein.

FIG. 3 is a block diagram showing details of an eNodeB 300 according to some embodiments. The eNodeB 300 may be suitable as eNodeB 102 (FIG. 1). While some embodiments are described with respect to an eNodeB that operates in accordance with 3GPP LTE, other embodiments can include similar circuitry for implementing functions of a NodeB in accordance with a 3GPP UMTS standard. The eNodeB 300 includes a processor 310, a memory 320, a transceiver 330, and instructions 335. The eNodeB 300 may include other elements (not shown).

The processor 310 comprises one or more central processing units (CPUs), graphics processing units (GPUs), or both. The processor 310 provides processing and control functionalities for the eNodeB 300. Memory 320 comprises one or more transient and static memory units configured to store instructions 335 and data for the eNodeB 300.

The transceiver 330 comprises one or more transceivers including a multiple-input and multiple-output (MIMO) antenna to support MIMO communications. The transceiver 330 receives UL transmissions and transmits DL transmissions, among other things, from and to UE 111 (FIG. 1).

The transceiver 330 can transmit a radio resource control (RRC) signal that includes an information element (IE) indicating whether the eNodeB supports user equipment (UE) usage of an extended paging value. The transceiver 330 can receive from the MME 101 (FIG. 1), the extended paging value, responsive to a request from the UE 111 to use the extended paging value.

The transceiver 330 can receive, from the UE 111, a value corresponding to the extended paging value, the value indicating a periodicity with which the UE 111 shall perform evaluation of a parameter of a network in which the UE 111 is operating. The eNodeB 300 can receive indications from the MME 101, for example, the eNodeB 300 can receive a TAU timer with a value that corresponds to the extended paging value, in a Tracking Area Update Accept information element (IE) in accordance with a standard of the 3rd Generation Partnership Project (3GPP) family of standards.

The instructions 335 comprise one or more sets of instructions or software executed on a computing device (or machine) to cause such computing device (or machine) to perform any of the methodologies discussed herein. The instructions 335 (also referred to as computer- or machine-executable instructions) may reside, completely or at least partially, within the processor 310 and/or the memory 320 during execution thereof by the eNodeB 300. The processor 310 and memory 320 also comprise machine-readable media.

As those of ordinary skill in the art will readily appreciate, various aspects described throughout this disclosure may be extended to other telecommunication systems, network architectures and communication standards. By way of non-limiting example, various aspects may be extended to other Universal Mobile Telecommunications System (UMTS) systems. Various aspects can be used in systems employing Long Term Evolution (LTE) (in FDD, TDD, or both modes), and LTE-Advanced (LTE-A) (in FDD, TDD, or both modes).

Examples, as described herein, may include, or may operate on, logic or a number of components, components, or mechanisms. Components are tangible entities capable of performing specified operations and may be configured or arranged in a certain manner. In an example, circuits may be arranged (e.g. internally or with respect to external entities such as other circuits) in a specified manner as a component. In an example, the whole or part of one or more computer systems (e.g. a standalone, client or server computer system) or one or more hardware processors may be configured by firmware or software (e.g. instructions, an application portion, or an application) as a component that operates to perform specified operations. In an example, the software may reside (1) on a non-transitory machine-readable medium or (2) in a transmission signal. In an example, the software, when executed by the underlying hardware of the component, causes the hardware to perform the specified operations.

Accordingly, the terms "component" and "component" are understood to encompass a tangible entity, be that an entity that is physically constructed, specifically configured (e.g. hardwired), or temporarily (e.g. transitorily) configured (e.g. programmed) to operate in a specified manner or to perform part or all of any operation described herein. Considering examples in which components are temporarily configured, one instantiation of a component may not exist simultaneously with another instantiation of the same or different component. For example, where the components comprise a general-purpose hardware processor configured using software, the general-purpose hardware processor may be configured as respective different components at different times. Accordingly, software may configure a hardware processor, for example, to constitute a particular component at one instance of time and to constitute a different component at a different instance of time.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure. The preceding description and the drawings sufficiently illustrate specific embodiments to enable those of ordinary skill in the art to practice them. Other embodiments may incorporate structural, logical, electrical, process, and other changes. Portions and features of some embodiments may be included in, or substituted for, those of other embodiments.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A user equipment (UE) comprising:
    processing circuitry arranged to
        determine to use an extended paging discontinuous reception (DRX) value to increase a paging cycle length above a value; and
        select a first periodicity, based on the extended paging DRX value, at which the UE is to perform evaluation of a parameter of a network in which the UE is operating; and
    physical layer circuitry arranged to
        transmit a message to the network, indicating that the UE desires to perform evaluation of the parameter at the first periodicity, wherein the UE is camped on a first cell in the network with a first priority level, and the first periodicity corresponds to a periodicity with which the UE is to perform measurements of cells in the network, other than the first cell, with priority levels higher than the first priority level.

2. The UE of claim 1, wherein the processing circuitry is further arranged to:
    select a second periodicity at which the UE is to perform measurements of cells in the network, other than the first cells, with priority levels equal to or lower than the first priority level; and
    reselect a cell in the network with a priority equal to or lower than the first priority level based upon measurements taken at the second periodicity.

3. The UE of claim 1, wherein the processing circuitry is further arranged to increase a timer expiration value for performing network operations, based on the extended paging DRX value.

4. The UE of claim 1, wherein the processing circuitry is further arranged to increase a validity period of system information received from the network based on the extended paging DRX value.

5. The UE of claim 1, wherein the UE is camped on a first cell in the network, and the periodicity corresponds to a periodicity with which the UE is to evaluate the first cell.

6. The UE of claim 1, wherein the UE is camped on a first cell in the network and the parameter corresponds to a criterion for evaluating whether to select a second cell for reselection.

7. An evolved NodeB (eNodeB) comprising:
a transceiver arranged to
- transmit a radio resource control (RRC) signal that includes an information element (IE) indicating whether the eNodeB supports user equipment (UE) usage of an extended paging value; and
- receive from the MME, the extended paging value, responsive to a request from the UE to use the extended paging value;
- receive, from the UE, a value corresponding to the extended paging value, the value indicating a periodicity with which the UE shall perform evaluation of a parameter of a network in which the UE is operating; and
- receive, from the MME, a tracking area update (TAU) timer with a value that corresponds to the extended paging value, in a Tracking Area Update Accept information element (IE) in accordance with a standard of the 3rd Generation Partnership Project (3GPP) family of standards.

8. A method, performed by a user equipment (UE) for power saving, the method comprising:
- determining to use an extended paging discontinuous reception (DRX) value to increase a paging cycle length above a value;
- selecting a first periodicity, based on the extended paging DRX value, at which the UE is to perform evaluation of a parameter of a network in which the UE is operating; and
- transmitting a message to the network, indicating that the UE desires to perform evaluation of the parameter at the first periodicity, wherein the UE is camped on a first cell in the network with a first priority level, and the first periodicity corresponds to a periodicity with which the UE is to perform measurements of cells in the network, other than the first cell, with priority levels higher than the first priority level.

9. The method of claim 8, further comprising:
- selecting a second periodicity at which the UE is to perform measurements of cells in the network, other than the first cell, with priority levels equal to or lower than the first priority level; and
- reselecting a cell in the network with a priority equal to or lower than the first priority level based upon measurements taken at the second periodicity.

10. A method, of claim 8, further comprising:
- increasing a timer expiration value for performing network operations, based on the extended paging DRX value.

11. The method of claim 8, further comprising:
- increasing a validity period of system information received from the network based on the extended paging DRX value.

12. The method of claim 8, wherein the UE is camped on a first cell in the network, and the periodicity corresponds to a periodicity with which the UE is to evaluate the first cell.

13. The method of claim 8, wherein the UE is camped on a first cell in the network and the parameter corresponds to a criterion for evaluating whether to select a second cell for reselection.

* * * * *